(12) United States Patent
Pieroni (10) Patent No.: US 7,305,176 B1
(45) Date of Patent: Dec. 4, 2007

(54) METHOD AND DEVICE FOR DETECTING LEAKS USING SMOKE

(75) Inventor: Kenneth Alan Pieroni, San Clemente, CA (US)

(73) Assignee: Redline Detection, LLC, Fullerton, CA (US)

( * ) Notice: Subject to any disclaimer, the term of this patent is extended or adjusted under 35 U.S.C. 154(b) by 1 day.

(21) Appl. No.: 10/975,781

(22) Filed: Oct. 28, 2004

(51) Int. Cl.
*F24F 6/08* (2006.01)
*B05B 1/24* (2006.01)

(52) U.S. Cl. ...................... 392/395; 239/135

(58) Field of Classification Search ............... 392/386, 392/387, 390, 394–401; 239/135, 136, 139; 261/139, 142, 341, 35, 37, 38, 104, 107; 73/40, 40.7, 45.1, 45.2, 45.4, 45.3
See application file for complete search history.

(56) References Cited

U.S. PATENT DOCUMENTS

| | | | |
|---|---|---|---|
| 3,024,200 A * | 3/1962 | Smith | 392/392 |
| 5,022,435 A * | 6/1991 | Jaw-Shiunn | 137/613 |
| 5,859,363 A * | 1/1999 | Gouge | 73/40.7 |
| 5,922,944 A | 7/1999 | Pelroni et al. | |
| 6,018,615 A * | 1/2000 | Loblick | 392/397 |
| 6,142,009 A | 11/2000 | Loblick | |
| 6,175,987 B1 * | 1/2001 | Harvey | 15/257.01 |
| 6,361,752 B1 * | 3/2002 | Demarest et al. | 422/306 |
| 6,392,227 B1 | 5/2002 | Banyard | |
| 6,439,031 B1 | 8/2002 | Pieroni et al. | |
| 6,526,808 B1 | 3/2003 | Pieroni et al. | |

* cited by examiner

*Primary Examiner*—Sang Paik
(74) *Attorney, Agent, or Firm*—Stetina Brunda Garred & Brucker (57) ABSTRACT

A smoke producing device for detecting leaks in a fluid system comprises a smoke producing chamber and a fluid reservoir for containing a smoke producing fluid. A heating element is provided within the smoke producing chamber. The chamber has a pressurized gas inlet for receiving a pressurized gas and an outlet port for conveying pressurized gas and/or smoke out of said chamber. A fluid transfer device has a first portion disposed within the fluid reservoir and a second portion which is adjacent and/or in contact with the heating element. The fluid transfer device is a capillary flow device which conveys smoke producing fluid from the fluid reservoir to the vicinity of the heating element primarily by capillary action.

26 Claims, 5 Drawing Sheets

METHOD AND DEVICE FOR DETECTING LEAKS USING SMOKE

FIELD OF THE INVENTION

The present invention relates generally to leak detection in fluid systems and more particularly to methods and devices for leak detection using smoke.

BACKGROUND OF THE INVENTION

There are many useful systems which contain and/or operate using a fluid (gas, liquid or combination of both). For example, automobiles have several systems which contain and utilize a fluid in their operation including the fuel system, the exhaust system, the heating, cooling and ventilation (HVAC) system, and the hydraulic power steering and brake systems, to name a few. Moreover, numerous industrial machines, household HVAC systems, and other devices utilize a fluid to operate. Such fluids include, for example, gases such as air or evaporated system liquid, fuel, hydraulic fluids, manufactured gases and liquids, and many other fluids.

In almost all circumstances, it is important, and in many cases crucial, that these fluid systems be properly sealed to prevent leakage of the system fluid. As an example, in an automobile fuel system, the gas tank and gas lines must be thoroughly sealed to prevent gasoline fumes from polluting the air and also to prevent leaking fuel from creating a fire hazard, not to mention the obvious benefit of conserving gasoline. In HVAC systems, it is important to seal the ducting which transports the conditioned air in order to maintain the efficiency of the systems. Air leaks tend to do nothing but heat or cool an attic, wall interior or other undesired space.

In many cases, leaks in fluid systems are very difficult to detect and/or locate because the leak is small or in a location not easily accessible. Accordingly, a variety of methods and devices have been devised to detect leaks in fluid systems. The most common leak detectors utilize a visual indicator to locate a leak so that the leak may be repaired. Some of the visual indicators include liquid dyes. The visual indicator is dispensed into the fluid system and leaks are detected by locating places on the system where the visual indicator has escaped the system. For instance, a liquid dye will leave a trace of dye at the leak and smoke will billow out through the leak. The liquid dyes are most useful for detecting leaks in fluid systems which utilize a liquid and are not so useful for gas systems or systems which must seal vapors created by the system fluid. Still, liquid leaks are typically easier to detect than gas and vapor leaks because the liquid itself is usually visible.

Vaporized dyes and smoke are most useful for detecting leaks in gas systems and systems which have vapors. In some cases, vaporized dye may be added to the smoke such that a trace of dye is left at the leak as the smoke flows through the leak. In general, devices for producing smoke for leak detection comprise a sealed chamber in which smoke is generated by vaporizing a smoke-producing fluid using a heating element. The smoke within the sealed chamber is forced out of the chamber through an outlet port by air pressure from a source of compressed air pumped into the sealed chamber. However, all of the previously disclosed smoke generating devices contact the smoke-producing fluid with the heating element to produce smoke by one of two methods. The first method is to locate the heating element within a reservoir of smoke-producing fluid. For example, U.S. Pat. No. 5,107,698, issued Apr. 28, 1992 to Gilliam, describes a smoke generating apparatus which has the heating element at least partially submerged within the smoke producing fluid in the fluid reservoir.

The drawbacks to a device in which the heating element is submerged within the smoke producing fluid are numerous. First of all, the level of the fluid within the chamber must be accurately controlled. This requires frequent monitoring and adjustment of the fluid level. Because the heating element is located within the fluid, the temperature of the heating element and the smoke chamber must also be accurately monitored and controlled in order to prevent combustion or explosion of the smoke-producing fluid. Worse yet, the fluid in the reservoir is heated and cooled with every use of the device, which tends to break down integrity of the fluid (such as oil). Also, in such recirculating designs, the fluid is easily contaminated by particulate and smoke by-products created by the smoke-producing process. The contaminants fall directly into the fluid reservoir because the smoke producing site is located directly within the fluid reservoir. The degraded fluid can cause several problems including ignition of the fluid, toxicity of the produced smoke and a decrease in smoke producing efficiency. This creates a serious maintenance issue requiring the regular replacement of the degraded fluid in the reservoir. Accordingly, the degrading of the fluid reduces reliability, may create a risk of combustion or explosion within the fluid reservoir, and the smoke produced with the contaminated fluid may have toxic components.

The second method of delivering the smoke-producing fluid to the heating element is to blow or spray the fluid onto the heating element. Examples of devices having this type of fluid delivery are described in U.S. Pat. No. 5,859,363, issued Jan. 12, 1999, to Gouge; U.S. Pat. No. 5,922,944, issued Jul. 13, 1999, to Pieroni et al.; U.S. Pat. No. 6,142,009, issued Nov. 7, 2000, issued to Loblick; U.S. Pat. No. 6,392,227, issued May 21, 2002, issued to Banyard et al.; U.S. Pat. No. 6,439,031, issued Aug. 27, 2002, to Pieroni et al.; and U.S. Pat. No. 6,526,808, issued Mar. 4, 2003, to Pieroni et al. In each of these devices, the smoke-producing fluid is blown, sprayed or atomized through a nozzle onto a heating element located above the fluid reservoir. Pressurized air is used to blow, spray or atomize the fluid through the nozzle. The heating element is purposely disposed above the fluid reservoir so that the blown, sprayed or atomized fluid which is not converted into smoke will return to the reservoir.

Again, this type of fluid delivery system has many drawbacks. For one, there must be a minimum amount of air pressure and air flow in order to spray the fluid onto the heating element. This prevents the device from being able to vary the flow rate of smoke being fed to the system being leak checked. A flow valve on the smoke outlet usually cannot be used to reduce the pressure and flow rate because the pressure drop through such valves causes at least some of the smoke to condense thereby reducing the amount of smoke produced. Also, the minimum amount of air pressure required by the smoke machine may exceed the pressure capacity of some systems which it is desired to leak check (for example, some automobile systems can only hold 4 inches of water pressure). Moreover, these smoke machines which require air flow to draw fluid into the air stream and/or spray the fluid toward the heating element are rendered inoperative if the flow rate is reduced below the operating level. This reduction may be caused by the system not having a large enough leak or by the use of a flow control value at either the inlet or outlet of the machine.

Furthermore, because the fluid is circulated back from the heating element to the fluid reservoir, this type of device suffers from the same contamination and degraded smoke producing fluid problems as described above.

Accordingly, there is a need for an improved method and device for producing smoke for detecting leaks in fluid systems which overcomes the deficiencies of previous devices. The device should be safe, reliable, compact, easy to use and maintain, and have a relatively low manufacturing and retail cost, compared to previously known machines.

SUMMARY OF THE INVENTION

The present invention provides methods and devices for detecting leaks in a fluid system using smoke. The smoke machine comprises a housing having a smoke producing chamber and a fluid reservoir for containing a smoke producing fluid. A heating element is provided within the smoke producing chamber. The chamber has a pressurized gas inlet for receiving a pressurized gas and an outlet port for conveying pressurized gas and/or smoke out of said chamber. A fluid transfer device has a first portion disposed within the fluid reservoir and a second portion which is adjacent and/or in contact with the heating element. The fluid transfer device is a capillary flow device which conveys smoke producing fluid from the fluid reservoir to the vicinity of the heating element primarily by capillary action.

The smoke machine may also comprise a pressure gauge which measures the pressure within said chamber, a flow meter which measures the flow rate of a pressurized gas provided to the chamber, pressure regulator to regulate the pressure of pressurized gas and a valve to shut-off or vary the flow rate of pressurized gas being provided to the chamber.

In operation of the smoke machine, the fluid reservoir is first filled with a smoke producing fluid, such as mineral oil. Then, a power source is connected to the heating element and pressurized gas, such as compressed air, is supplied to the chamber. The fluid transfer device conveys the smoke producing fluid from the reservoir to the vicinity of the heating element by capillary action. Advantageously, the fluid transfer device does not require any power source to properly operate. As smoke producing fluid comes near to, or in contact with, the heating element, it is vaporized into smoke. The pressurized gas then carries the smoke out of the chamber through the outlet port.

In order to detect a leak in a fluid system, the smoke exiting the outlet port is conveyed into the fluid system, for example through a conduit connected to the outlet port. The presence and location of a leak in the fluid system, if any, is quickly and easily found by visually detecting smoke escaping from the system through a leak. Conversely, if no smoke escapes, then the integrity of the fluid system is confirmed and no repairs should be needed. In a further aspect of the present invention, the valve may be adjusted to vary the flow rate of pressurized gas being supplied to the chamber. In addition, the valve may be closed to isolate the fluid system from the pressurized gas and the pressure gauge may be monitored to detect any pressure decay which can indicate the presence and/or size of a leak in the fluid system.

DETAILED DESCRIPTION OF THE INVENTION

Turning to FIGS. 1-4, a smoke machine 10 according to the present invention comprises a housing 12. The housing 12 has a top cap 14, a main body 16 and a bottom cover 18. The top cap 14 and the main body 16 form a smoke generating chamber 20. The top cap 14, main body 16 and bottom cover 18 may be made of aluminum which is strong and lightweight, or any other suitable material such as stainless steel or plastic. The top cap 14 has a flange 22 with four through-holes 24. The top cap 14 is installed on the main body 16 with the flange 22 resting on the top surface of the main body 16 and four screws 26 secure the top cap 14 to the main body 16. A seal or gasket (not shown) may be utilized to seal interface between the flange 22 and the top surface 23 of the main body 16. A pressure gauge 15 is attached to the top cap 14 and measures the pressure in the chamber 20. A hook 17 is attached to the top cap 14 for hanging the smoke machine 10 in a convenient location such as under the hood of an automobile. Also, the bottom of the bottom cover 18 has a plurality of non-slip feet 11 so that the smoke machine 10 can stably and securely rest on a flat surface.

The bottom cover 18 slides over a lower portion 30 of the main body 16 and is held in place on the main body by four screws 28. Again, a seal or gasket (not shown) may be provided to seal the interface between the inner surface of the bottom cover 18 and the lower portion 30 of the main body 16.

Figure 1:
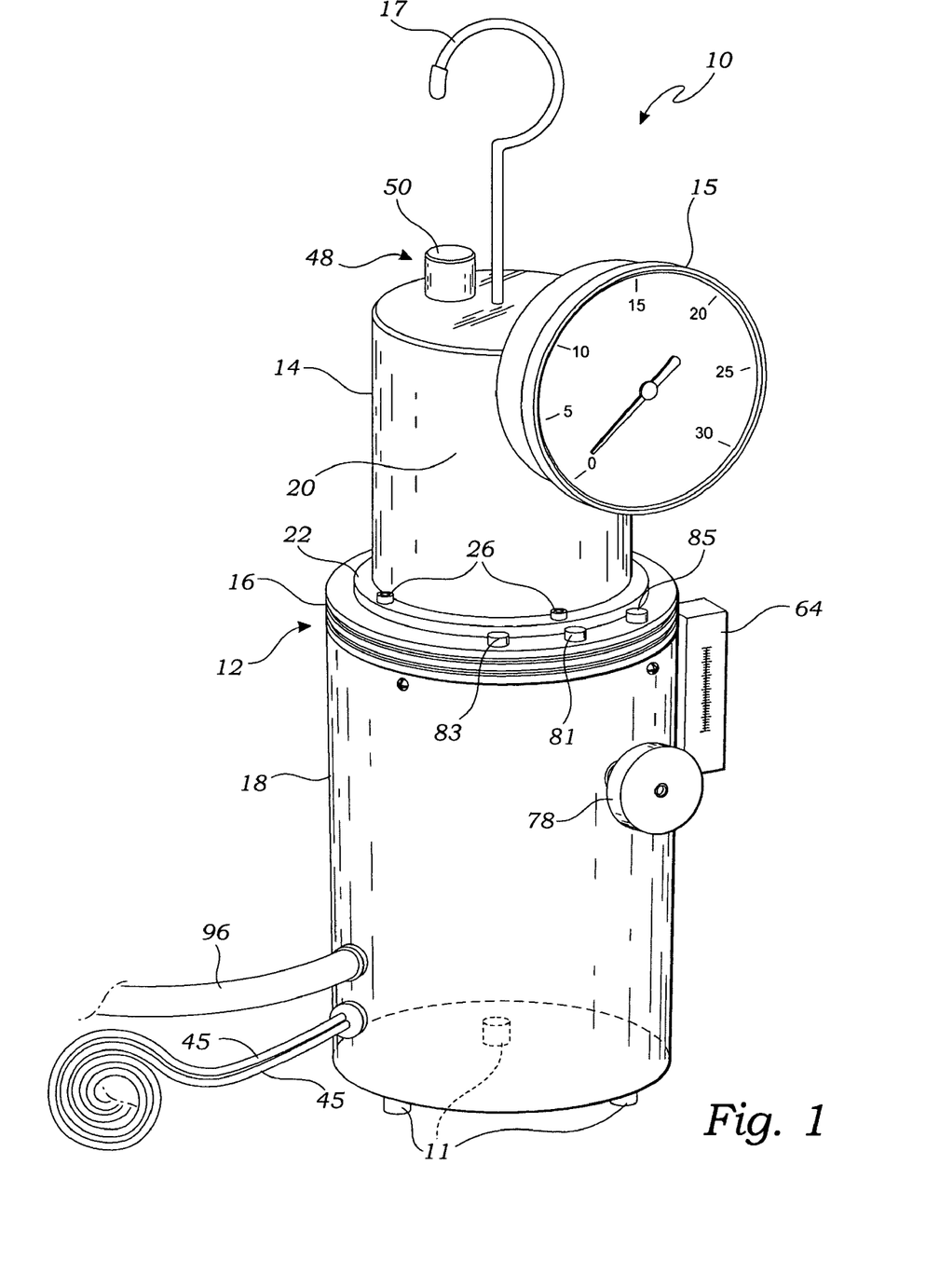
FIG. 1 is a front perspective view of a smoke machine according to the present invention.
Figure 2:
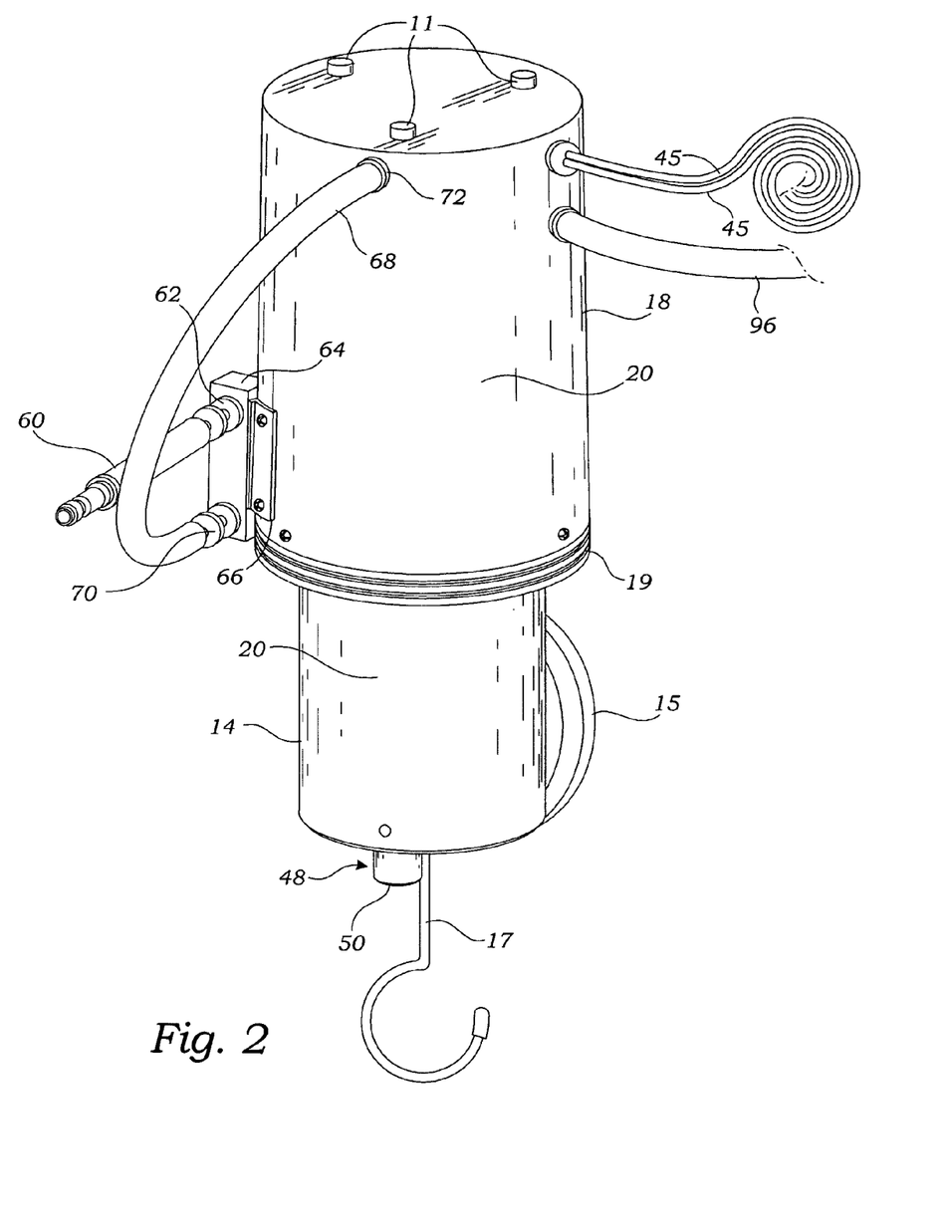
FIG. 2 is a rear perspective view of the smoke machine of FIG. 1.
Figure 3:
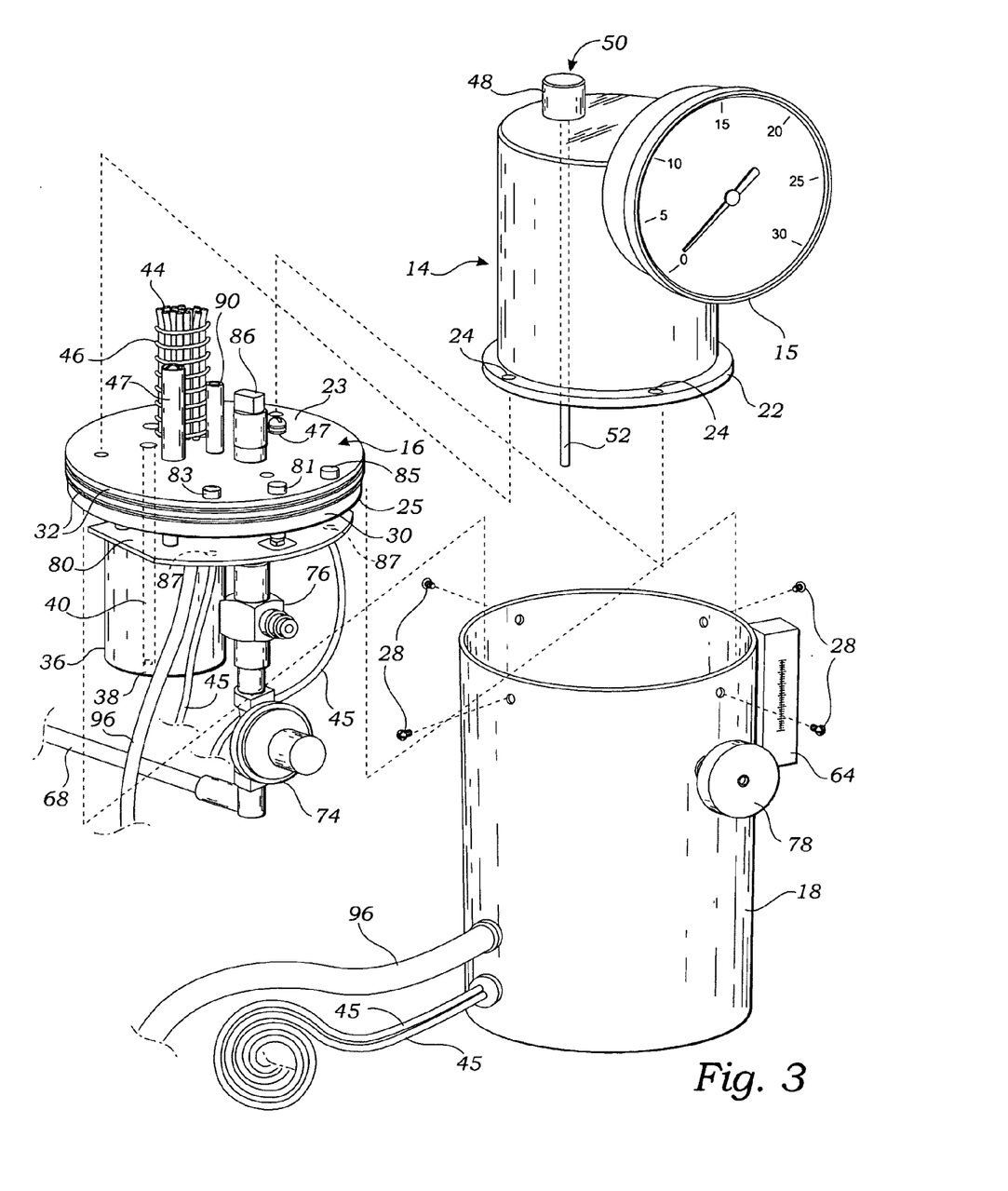
FIG. 3 is a perspective exploded view of the smoke machine of FIG. 1.
Figure 4:
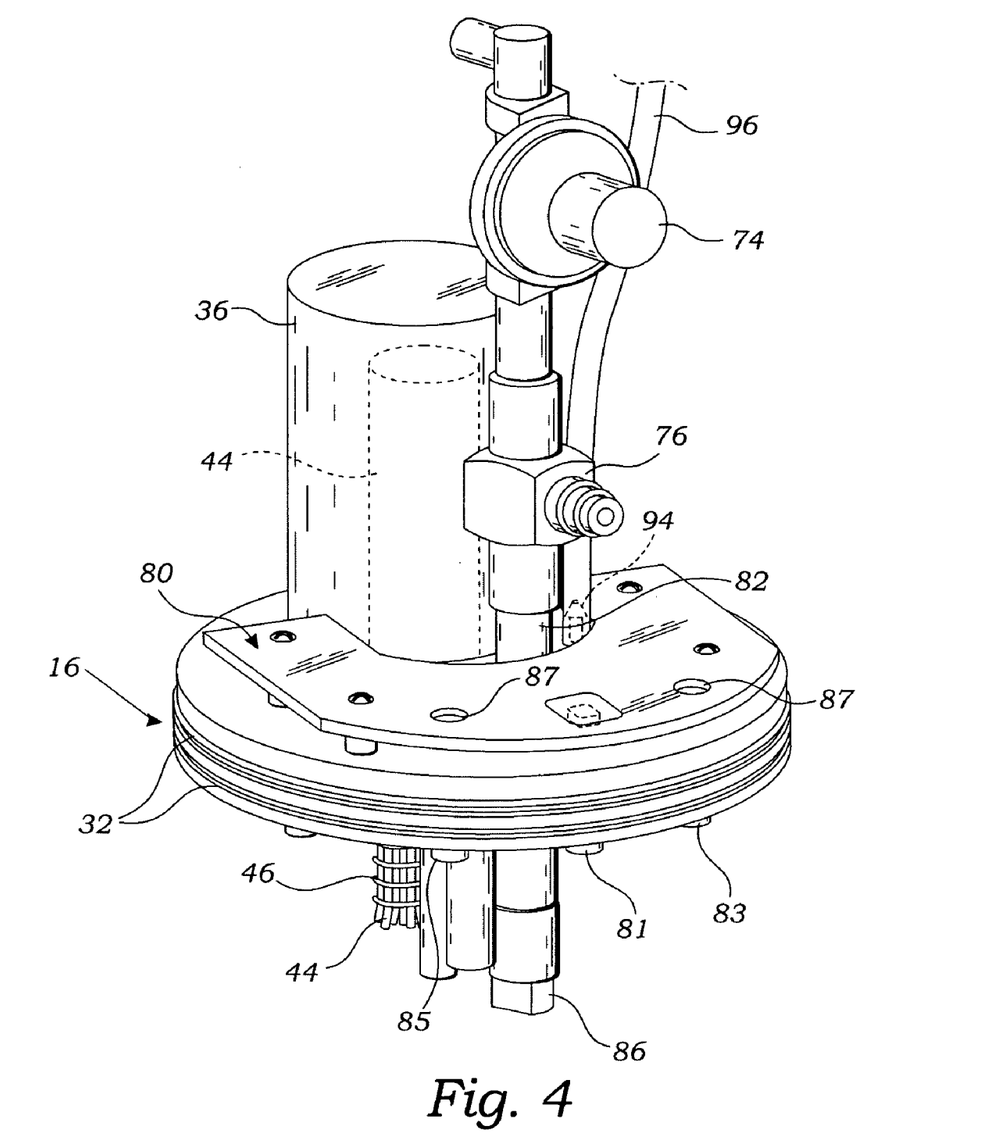
FIG. 4 is a perspective bottom view of the main body subassembly of the smoke machine of FIG. 1.
Figure 5:
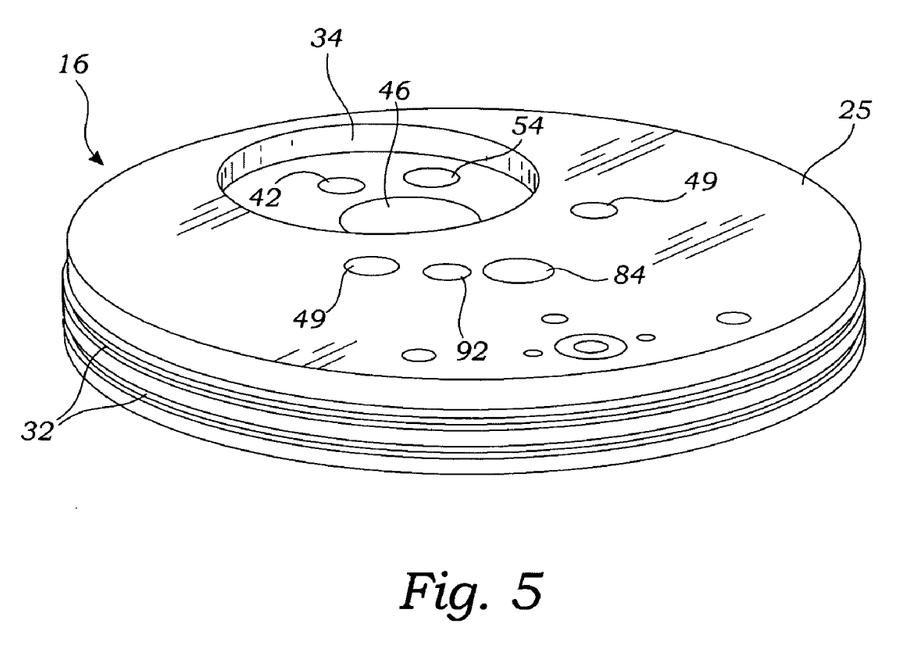
FIG. 5 is a perspective side view of the main body of the smoke machine of the FIG. 1.

Turning to FIG. 5, the main body 16 is preferably a machined aluminum component, but may be manufactured by any other suitable process. The main body 16 is a generally cylindrical and disc-shaped and has two grooves 32 around its circumference. The lower portion 30 has a reduced diameter which forms a shoulder for receiving the bottom cover 18. The bottom surface 25 of the main body 16 has a round recess 34 for receiving a fluid reservoir 36. The top lip (not shown) of the fluid reservoir 36 slides into the recess 34. A gasket or seal (not shown) may be used to seal the interface between the main body 16 and the lip of the fluid reservoir 36.

The fluid reservoir 36 is a container for holding smoke producing fluid. The fluid reservoir 36 may be made of aluminum or any other suitable material which is compatible with the particular smoke producing fluid(s) being used. The fluid reservoir 36 has a threaded hole 38 (the hole 38 does not protrude through the bottom of the fluid reservoir 36) in the bottom for receiving a bolt 40 which secures the fluid reservoir 36 to the main body 16. The main body 16 has a through-hole 42 (see FIG. 5) through which the bolt 40 inserts and the head of the bolt (not shown) bears on the top surface 23 of the main body 16.

A dipstick 48 is provided so that the level of fluid in the fluid reservoir 36 may be checked without removing any of the covers or even the fluid reservoir 36 itself. The dipstick 48 has a handle 50 with threads which mate with threads on the top of the top cap 14. The shaft 52 of the dipstick 48 extends down through the chamber 20, through a through-hole 54 in said main body 16 and into the fluid reservoir 36.

The bottom portion of the shaft 52 of the dipstick 48 may have graduations for indicating the level of fluid in the fluid reservoir 36. In order to fill the fluid reservoir 36 with smoke producing fluid, the dipstick is simply removed and fluid is poured into the threaded hole on the top of the fop cap 14.

The smoke producing fluid is a fluid which when heated to a certain temperature will produce a dense, non-toxic smoke. Suitable fluids include non-toxic petroleum based oils, such as mineral oil (baby oil). While the term "smoke" generally refers to the vapor and particulate that is a byproduct of incomplete combustion, the term "smoke" as used herein includes any visible gas, vapor, and/or aerosol (particulate suspended in a gas) or any combination thereof. The term "vaporize" means to transform a fluid into smoke.

A fluid transfer device 44 extends from within the chamber 20 down through a through-hole 46 in the main body 16 (see FIG. 5) and into the fluid reservoir 36. The bottom end of the fluid transfer device 44 preferably extends almost to the bottom of the fluid reservoir 36. The fluid transfer device 44 may touch the bottom of the fluid reservoir 36, but should not unduly restrict the fluid reservoir 36 from properly seating in the recess 34. The fluid transfer device 44 uses primarily capillary action to convey smoke producing fluid from the fluid reservoir up into the smoke producing chamber 20 and into the vicinity of a heating element 46. The term "primarily capillary action," or other similar terms, means that the fluid is conveyed by this type of force more than any other force such as pumping, or pressure differentials caused by suction, but does not exclude that some force may be applied to the fluid by modes other than capillary action. Capillary action refers to the motive force on a fluid produced by the surface tension between the fluid and a surface, in this case the smoke producing fluid and the material of the fluid transfer device 44. Capillary action as used herein is not limited to the movement of a fluid in a tube or vessel, but includes any movement of fluid caused primarily by the surface tension forces described above.

The fluid transfer device 44 may comprise a woven fiberglass wick such as the wick material available from Fil-Tec Company located in Hagerstown, Md. The woven wick is one inch in diameter. The fluid transfer device 44 must be able to withstand very high temperatures while also producing enough capillary action to convey the fluid from fluid reservoir 36 to the heating element 46. Woven fiberglass is an excellent transfer device because the fiberglass can withstand temperatures as high as 1000 degrees Fahrenheit and the woven fiberglass material can convey an adequate supply of fluid by capillary action to the heating element to produce an ample amount of smoke. Moreover, fiberglass is also an excellent thermal insulator so that any heating of the fluid in the fluid reservoir 36 by the heat produced by the heating element 46 is minimized. In this described embodiment, the fluid transfer device 44 comprising a woven fiberglass wick conveys the fluid from the fluid reservoir 36 to the heating element 44 substantially or solely by means of capillary action, although the present invention is limited to such a fluid transfer device 44.

Alternatively, the fluid transfer device 44 may be any other suitable device which can adequately convey fluid from the fluid reservoir 36 to the heating element 46 primarily by capillary action. For example, an array of small, straight tubes, capillaries or filaments may also be a suitable fluid transfer device 44.

The heating element 46 is a coil of resistive wire which generates heat when an electrical current is conducted through normally by placing an electrical voltage across the wire. The wire is coiled closely around the fluid transfer device 44 such that when the heating element 46 is energized and heated, the smoke producing fluid on the upper portion of the fluid transfer device 36 will be vaporized into smoke. One suitable wire for the heating element 46 is a 20 gauge alloy-52 wire (52% nickel, 48% iron) available from Strategic Aerospace Materials in Hicksville, N.Y. Of course, other suitable wire or resistive heating material may be used within the present invention.

The heating element 46 is electrically connected to two electrical standoffs 47. The electrical standoff 47 extend through holes 49 in the main body 16. Each electrical standoff 47 comprises an electrically conducting core and an electrically insulating sheath which insulates the core from the main body 16. The other end of the electrical standoffs 47 are electrically connected to a controller 80. A pair of extension cables 45 electrically connect to a pair of electrical inputs 87 on the controller 80. In order to power the smoke machine 10, the extension cables 45 are connected to a power source such as a battery, a transformer or an electrical outlet.

The controller 80 comprises a printed circuit board having a power switch. The controller 80 is configured such that it is capable of one or more of the following functions: measuring the temperature of the heating element 46, turning on and off one or more indicator lights; detecting the polarity of and turning on and off the power to the heating element 46 based on temperature and/or cycle-time criteria. The power switch on the controller 80 is operably coupled to an on/off button or switch 81 located on the top surface 23 of the main body 16. The controller 80 is also operably coupled to two indicator lights 83 and 85. The indicator lights 83 and 85 may be different colors, such as red and green, respectively. The controller 80 is configured such that one indicator light, for example green light 83, will be lit if a power source is connected to the extension cables with the correct polarity. The controller 80 is also configured to light the other indicator light, the red light 85, when the on/off button 81 has been actuated to turn on the smoke machine 10. Finally, the controller 80 controls the power being supplied to the heating element 46. The controller may be programmed to energize the heating element 46 when the temperature of the heating element 46 is below a specified temperature and to de-energize the heating element 46 when the temperature of the heating element exceeds a specified temperature. Alternatively, in a more complex control scheme, the controller may be programmed to initially energize the heating element 46 for a specified period of time. A the end of the initial time period, the controller 80 de-energizes the heating element 46. The controller then evaluates the temperature of the heating element and if the temperature of the heating element 46 is below a specified value, the controller 80 again energizes the heating element 46 for another specified period of time (which may be the same or a different length of time as the initial time period). This cycle continues until the heating element 46 reaches the prescribed operating temperature such that the controller 80 de-energizes the heating element 46. Then, the heating element 46 is left de-energized for a specified period of time. After the specified period of time has expired, the controller 80 evaluates the temperature of the heating element and if the heating element 46 is above a specified temperature, the heating element remains de-energized. If the heating element 46 is below the specified temperature, the controller 80 energizes the heating element 46. This cycle continues for as long as the smoke machine 10 is being used to produce smoke.

In order to convey the smoke produced by the smoke machine 10 into a fluid system to check for leaks, a source of pressurized gas is supplied to the chamber 20 through a pressurized gas fluid path. The fluid path begins at an inlet conduit 60 which has a first end for connection to a source of pressurized gas such as an air compressor and a second end connected to a flow meter inlet port 62. The inlet port 62 may comprise a barbed fitting for securely retaining the inlet conduit 60. The flow meter 64 is shown as a simple graduated floating ball flow meter, but other meters capable of measuring fluid flow rates may also be utilized, including electronic flow meters which may be electrically connected to the controller 80. The flow meter 64 is secured to the bottom cover 18 using a flow meter bracket 66 which is attached to both the flow meter 64 and the bottom cover 18.

A flow meter conduit 68 extends from a flow meter outlet port 70, through a hole 72 in the bottom cover 18 and connects to an inlet of a pressure regulator 74. The pressure regulator 74 may be set to reduce the incoming gas pressure to the desired pressure depending on the types of fluid system to be leak checked. For example, for fuel vapor recovery systems in automobiles the pressure regulator should be set to about 13 inches of water column. The outlet of the pressure regulator is connected to a flow valve 76. The control knob 78 of the flow valve 76 extends through a hole in the side of the bottom cover so that the flow valve 76 may be adjusted during the operation of the smoke machine. Alternatively, the flow valve may be an electronic valve which is connected to the controller 80.

The outlet of the flow valve 76 is connected to an adapter fitting 82 which threads into a threaded hole 84 in the main body 16. A pressurized gas flow regulator 86 is threaded into the other side of the threaded hole 84. The gas flow regulator 86 is a fitting with one or more outlet orifices sized to control the flow rate of gas out of the orifices and into the chamber 20. The orifices may have a total area of opening totaling approximately 0.0064 square inches. At a pressure of 13 inches of water column, the orifices will regulate the flow rate to about 15 liters per minute. Without this regulator 86, the flow rate of pressurized gas is normally the maximum flow rate of the pressure regulator 74. In many cases, it is easier to detect and pinpoint the location of a leak with a smaller flow rate because the leak is not completely shrouded by smoke. This completes the pressurized gas fluid path.

A smoke outlet standoff 90 is threaded into a threaded through hole 92 of the main body 16. A fitting 94 is threaded into the other side of the hole 92. The fitting 94 has a barbed end for securely retaining a smoke supply conduit 96 which extends out of the bottom cover 18 through a hole in the bottom cover 18. The other end of the smoke supply conduit 96 is used to convey smoke from the smoke machine 10 to the fluid system being leak checked.

The operation of the smoke machine 10 to detect a leak in a fluid system is as follows. The dipstick 48 is removed to check the level of smoke producing fluid in the fluid reservoir 36. If the fluid level is too low or too high, fluid is added or removed through the dip stick 48 hole until the proper fluid level is achieved. A supply of pressurized gas, such as an air compressor, is connected to the inlet conduit 60 or directly to the flow meter inlet port 62. The extension cables 45 are connected to a power source such as a 12-volt automobile battery. If the cables 45 are connected to correct polarity, the controller 80 will light the green indicator light 83. If the indicator light 83 does not illuminate, the user must reverse the connection of the cables 45. The smoke outlet conduit 96 is connected to the fluid system to be leak checked. An adapter may be utilized to connect the conduit 96 to the fluid system. For example, in leak testing an automobile exhaust system, an exhaust cone adapter may be used. The exhaust cone adapter has one end which fits into a tailpipe and the other end has a fitting to receive the conduit 96. The fluid system may require one or more plugs to be installed in order to close the system so that it can hold pressure.

Once the smoke machine 10 is properly set-up and connected to the fluid system, the pressure gauge 15 may be checked to ensure that the proper pressure of compressed air is being supplied. Several types of leak tests may now be performed with the smoke machine 10. With the smoke machine 10 in either the "on" mode in which it is producing smoke, or in the "off" mode in which it is not producing smoke, a leak test to determine whether there is a leak in the fluid system may be performed by allowing the compressed air to pressurize the fluid system for a period of time. As the fluid system is being pressurized by the compressed air, the flow meter 64 will indicate an amount of volumetric flow of compressed air into the smoke machine 10 and fluid system. As the fluid system is filled and pressurized, the pressure gauge 15 will indicate an increase in system pressure and the flow meter 64 will indicate that the flow rate is slowly decreasing. After a period of time depending on the volume of the fluid system being checked, the system will reach an equilibrium in which the pressure will stabilize at or near the pressure of compressed gas being supplied by the smoke machine 10 (the pressure set by the pressure regulator 74). If the system has a leak, the flow meter 64 will indicate an amount of flow equivalent to the amount of air leaking out of the system. If the flow meter 64 indicates zero flow rate, then there are no leaks in the fluid system (or at the least, no leaks larger than the sensitivity of the flow meter 64). The size of the leak(s) may be approximated by reference to a calibration table or formula which correlates the size of the area of a leak to the pressure and flow rate through the leak.

Another leak test may be performed by pressurizing the fluid system as described above and then completing closing the flow valve 76. The pressure gauge 15 is then monitored to determine if there is any pressure decay in the fluid system. If the pressure holds, then there is no leak in the fluid system. If the pressure decreases, then there is a leak in the system. The rate of pressure decay can be used to approximate the size of a leak similar to the method described above with respect to flow rate.

To determine the location of a leak in the fluid system, the smoke machine 10 must be turned on. The on/off button 81 is depressed to turn on the smoke machine 10. The controller 80 then energizes the heating element 46 and turns on the red indicator light (85). The controller 80 will energize the heating element 46 by any suitable process, including without limitation the processes described above. The heating element 46 vaporizes the fluid on the fluid transfer device 44 which is in the vicinity of the heating element 46, thereby producing smoke. The smoke is conveyed into the fluid system and the user then inspects the fluid system for any escaping smoke. If smoke is detected, the flow valve 76 may be adjusted to decrease the flow of smoke to more easily pinpoint the location of the leak in the fluid system.

While the present invention has been fully described above with particularity and detail in connection with what is presently deemed to be the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A device for generating smoke for connection to a source of pressurized gas, comprising:
   a housing having disk-shaped main body having a top surface and a bottom surface and a first aperture extending from said top surface to said bottom surface, a top cap attached to said top surface of said main body, and a bottom cover attached to said bottom surface of said main body, said main body and said top cap forming a chamber;
   a heating element disposed within said chamber;
   a fluid reservoir for holding a supply of fluid, said fluid reservoir attached to said bottom surface of said main body and having a second aperture which is in communication said first aperture;
   a gas inlet for connection to the source of pressurized gas;
   a gas supply fluid path extending from said gas inlet into said bottom cover, through said main body and into said chamber;
   a fluid transfer device having a first portion and a second portion, said first portion disposed within said fluid reservoir and a second portion being adjacent said heating element, said fluid transfer device being configured to convey a fluid from said fluid reservoir to said heating element primarily by capillary action.

2. The device of claim 1 wherein said fluid transfer device is a wick.

3. The device of claim 1 wherein said fluid transfer device is a plurality of wicks.

4. The device of claim 2 wherein said wick comprises a piece of woven fiberglass.

5. The device of claim 2 wherein at least one of said plurality of wicks comprises a piece of woven fiberglass.

6. The device of claim 1 further comprising an air inlet having a first end connectable to a source of pressurized gas and a second end in fluid communication with said chamber.

7. The device of claim 6 further comprising a smoke outlet having a first end in fluid communication with said chamber and a second end connectable to a conduit.

8. The device of claim 1 wherein said heating element comprises an electrically conductive wire.

9. The device of claim 8 wherein said wire is configured into a coil or other suitable shape.

10. The device claim 6 further comprising a pressure regulator in fluid communication with said air inlet.

11. The device of claim 6 further comprising an adjustable valve in fluid communication with said air inlet.

12. The device of claim 1 further comprising a flow gauge in fluid communication with said air inlet for measuring the flow rate of pressurized gas through said air inlet.

13. A method of producing smoke using the device of claim 1, comprising the following steps:
   providing a supply of smoke producing fluid in a reservoir;
   providing a heating element within a chamber;
   conveying said fluid from said reservoir to said heating element primarily by capillary action using a fluid transfer device;
   heating said fluid with said heating element to produce smoke in said chamber.

14. The method of claim 13 wherein said fluid transfer device is a wick.

15. The method of claim 14 wherein said wick comprises a piece of woven fiberglass.

16. The method of claim 13 further comprising the step of supplying a pressurized gas into said chamber.

17. The method of claim 16 further comprising the step of conveying said smoke out of said chamber into a conduit.

18. The method of claim 17 further comprising the step of adjusting a valve to vary the flow rate of the pressurized gas being supplied to said chamber.

19. The method of claim 18 further comprising the step of monitoring a pressure gauge which measures the pressure inside said chamber.

20. A method of detecting a leak in a fluid system using the device of claim 1, comprising the following steps:
   (a) providing a supply of smoke producing fluid in a reservoir;
   (b) providing a heating element within a chamber;
   (c) conveying said fluid from said reservoir to said heating element primarily by capillary action using a fluid transfer device;
   (d) heating said fluid with said heating element to produce smoke in said chamber;
   (e) supplying a pressurized gas into said chamber;
   (f) conveying said smoke out of said chamber into said fluid system.

21. The method of claim 20 further comprising the step of adjusting a valve to vary the flow rate of the pressurized gas being supplied to said chamber.

22. The method of claim 20 further comprising the step of monitoring a pressure gauge which measures the pressure inside said chamber.

23. The method of claim 20 further comprising the following steps:
   (g) pressurizing said fluid system being checked for a leak using said pressurized gas;
   (h) shutting a valve to seal off said pressurized gas from said fluid system; and
   (i) monitoring the pressure in said fluid system.

24. The method of claim 23 wherein said chamber is maintained in fluid communication with said fluid system after performing step (g) and step (h) and said pressure in said fluid system is monitored by monitoring the pressure in said chamber.

25. The method of claim 23 wherein steps (g)-(i) are performed before to steps (a)-(f).

26. The method of claim 23 wherein steps (g)-(i) are performed after steps (a)-(f).

* * * * *